(12) United States Patent
Keitzel et al.

(10) Patent No.: US 12,420,372 B2
(45) Date of Patent: Sep. 23, 2025

(54) CUTTING MACHINE COMPRISING A FORCE TRANSDUCER, USE OF SUCH A CUTTING MACHINE AND PROCESS OF CALIBRATING THE FORCE TRANSDUCER OF SUCH A CUTTING MACHINE

(71) Applicant: KISTLER HOLDING AG, Winterthur (CH)

(72) Inventors: Gunnar Keitzel, Hettlingen (CH); Denis Kohler, Neftenbach (CH)

(73) Assignee: Kistler Holding AG, Winterthur (CH)

( * ) Notice: Subject to any disclaimer, the term of this patent is extended or adjusted under 35 U.S.C. 154(b) by 367 days.

(21) Appl. No.: 17/909,014

(22) PCT Filed: Jan. 21, 2021

(86) PCT No.: PCT/EP2021/051358
§ 371 (c)(1),
(2) Date: Sep. 2, 2022

(87) PCT Pub. No.: WO2021/185496
PCT Pub. Date: Sep. 23, 2021

(65) Prior Publication Data
US 2023/0090638 A1    Mar. 23, 2023

(30) Foreign Application Priority Data

Mar. 19, 2020 (EP) .................................. 20164251

(51) Int. Cl.
*B23Q 17/09* (2006.01)
*B23B 29/26* (2006.01)

(52) U.S. Cl.
CPC .......... *B23Q 17/0966* (2013.01); *B23B 29/26* (2013.01); *B23Q 2717/003* (2013.01)

(58) Field of Classification Search
CPC .......... B23Q 17/0966; B23Q 2717/003; B23B 29/26
See application file for complete search history.

(56) References Cited

U.S. PATENT DOCUMENTS

| 3,826,131 A | 7/1974 | Pritschow |
| 4,899,594 A | 2/1990 | Wolfer et al. |
(Continued)

FOREIGN PATENT DOCUMENTS

| CN | 104139322 A | 11/2014 |
| CN | 205 834 265 U | 12/2016 |
(Continued)

OTHER PUBLICATIONS

Chinese Office Action with Translation, Jul. 14, 2023, 19 pages.
(Continued)

*Primary Examiner* — Clayton E. LaBalle
*Assistant Examiner* — Diana Hancock
(74) *Attorney, Agent, or Firm* — Dority & Manning, P.A.

(57) ABSTRACT

A cutting machine configured for the chip-removing machining of a workpiece includes a plurality of required tools. Each tool can exert a tool force onto the workpiece. The cutting machine includes a tool holder for simultaneously holding all of the tools required for operating on the workpiece. A tool slide moves the tool holder to successively align one of the tools to operate on the workpiece, and the tool and the workpiece are movable for chip-removing machining in each manufacturing step. The tool holder includes at least two single-component force transducers. Each single-component force transducer measures a tool force exerted by one of the tools during the chip-removing machining of the workpiece in a force main connection.

12 Claims, 6 Drawing Sheets

(56) References Cited

U.S. PATENT DOCUMENTS

| | | | |
|---|---|---|---|
| 5,297,430 A | | 3/1994 | Sonderegger et al. |
| 10,875,138 B1* | | 12/2020 | Mann ................. B23Q 11/1015 |
| 2007/0016325 A1* | | 1/2007 | Esterling ............ G05B 19/4065 |
| | | | 700/175 |
| 2021/0146456 A1* | | 5/2021 | Clossen-von Lanken Schulz ...... |
| | | | B23C 3/30 |
| 2022/0032416 A1* | | 2/2022 | Fimpel ................... B23B 25/06 |
| 2022/0404802 A1* | | 12/2022 | Fimpel ................... B23Q 15/12 |

FOREIGN PATENT DOCUMENTS

| | | |
|---|---|---|
| DE | 3440670 A1 | 5/1986 |
| EP | 0321599 A1 | 6/1989 |
| EP | 3031556 A1 | 6/2016 |
| JP | S4712583 U | 10/1972 |
| JP | H01301045 | 12/1989 |
| JP | 2009083073 A | 4/2009 |

OTHER PUBLICATIONS

Translation—Japanese Office Action, Nov. 14, 2023, 3 pages.
The International Search Report and Written Opinion, with the English translation, for PCT application No. PCT/EP2021/051358, mail date Apr. 19, 2021.
Kistler Gruppe, Triaxial Force Sensors for compression, tensile and shear forces of ±3kN . . . ±150kNs, Datasheet 90x7C_003-525e-12.20, Winterthur, Schweiz, 2020, pp. 1-6.
Kistler Gruppe SlimLine Sensor (SLS) Measurement of Dynamic and Quasistatic Shear Forces—0,9 . . . 0,9 kN up to 0 . . . ±8 kN , Datasheet 9143B_000-113e-03.16, Winterthur, Schweiz, , 2009-2016, pp. 1-5.

* cited by examiner

CUTTING MACHINE COMPRISING A FORCE TRANSDUCER, USE OF SUCH A CUTTING MACHINE AND PROCESS OF CALIBRATING THE FORCE TRANSDUCER OF SUCH A CUTTING MACHINE

CROSS REFERENCE TO RELATED APPLICATIONS

The present application claims priority to International Application Serial No. PCT/EP2021/051358, which is hereby incorporated herein in its entirety by this reference for all purposes.

FIELD OF THE INVENTION

The present invention relates to a cutting machine that includes a force transducer. Furthermore, the invention relates to a use of such a cutting machine. Moreover, the invention relates to a process for calibrating the force transducer of such a cutting machine.

BACKGROUND OF THE INVENTION

Cutting machines are well known. Known cutting machines include lathes, milling machines, machine saws, etc. Cutting machines are used to shape a workpiece by chip-removing machining, i.e. by removing material from the workpiece by means of a wedge-shaped cutting blade. The cutting blade exerts a tool force. The workpiece is made of any material such as metal, wood, plastics, etc. The cutting blade is made of a hard, resistant and tough cutting material such as metal, ceramics, etc. Known tools used for chip-removing machining are chisels, lathe chisels, milling cutters, spot facers, saw blades, etc.

For chip-removing machining, the workpiece and tool are moved against each other. To this end, both the workpiece and the tool are moved in a straight line or in a circle. The cutting machine comprises several drive units such as electrical drive units, pneumatic drive units, etc., for this purpose.

To produce a workpiece cost-effectively and with consistent quality it is desirable to measure the tool force since the tool force as well as the elevated temperatures that occur during chip-removing machining lead to abrasion of the cutting blade. Abrasion alters the blade geometry of the cutting blade. In addition, an abraded cutting blade requires a greater tool force for chip-removing machining of the workpiece which is reflected in a higher energy consumption of the cutting machine and which also reduces the surface quality and dimensional accuracy of the workpiece.

Applicant's commonly owned EP0433535A1 discloses an arrangement comprising a force transducer for measuring the tool force during chip-removing machining of a workpiece in a cutting machine. The force transducer is inserted in a recess of a machine portion in a force-fitting manner.

However, the known arrangement has the disadvantage that the tool force is not measured at its point of action, i.e. at the cutting blade, but at a point remote from the cutting blade, namely in a machine portion. There, the tool force is measured in an indirect manner as a mechanical stress occurring in the machine portion. The mechanical stress itself is affected by the dimensions and the mass of the machine portion.

In addition, the force transducer of the known arrangement is arranged in a force shunt in the machine portion. Only a small fraction of the mechanical stress that occurs can be measured in a force shunt. All this leads to the tool force being measured with poor accuracy. Accuracy during the measurement of the tool force is an indication of a difference between the measured tool force and the actual tool force; the more accurate the tool force is measured, the smaller will be the difference between the measured tool force and the actual tool force.

Furthermore, the force transducer of the known arrangement measures several force components of the tool force. It measures a feed force in the x-direction, a passive force in the y-direction, and a main cutting force in the z-direction. This multi-component force transducer comprises at least one piezo element for each force component. The piezo element is arranged to detect the force component with high sensitivity. The at least three piezo elements are stacked on top of each other in the z-direction within a housing. See applicant's commonly owned U.S. Design Pat. No. D572,158, which is hereby incorporated in its entirety herein for all purposes by this reference. See also applicant's commonly owned U.S. Pat. No. 3,566,166, which is hereby incorporated in its entirety herein for all purposes by this reference. As a result, the constructional dimensions of the multi-component force transducer comprise a comparatively large height in the z-direction. Such a multi-component force transducer is commercially available from the applicant with the type designation 9027C and with the data sheet 9027C_000-726d-03.10. The multi-component force transducer is hollow cylindrical in shape having an outer diameter of 24.0 mm, an inner diameter of 9.6 mm, and a height of 12.0 mm. Furthermore, procurement of the multi-component force transducer is comparatively expensive. A force sensor such as disclosed in applicant's commonly owned U.S. Pat. No. 5,297,430, which is hereby incorporated in its entirety herein for all purposes by this reference, while configured with a profile that is flat and thin, only has the capability of sensing one orthogonal component of force.

Usually, chip-removing machining of a workpiece is performed in a chronological sequence of manufacturing steps by using a plurality of required tools. Thus, the tools are changed frequently. In each new production step, a new tool is aligned with the workpiece. Therefore, the cutting machine comprises a tool holder for a quick and cost-effective tool change and a quick and equally cost-effective tool alignment. The tool holder holds all the tools required for the production steps of chip-removing machining at the same time. For this purpose, the tool holder is loaded with all the required tools before the chip-removing machining process is started. In this way, no tools have to be removed from the cutting machine or inserted into the cutting machine during the chip-removing machining process. For changing to a new tool during chip-removing machining and aligning the new tool with the workpiece, it is only necessary to move the tool holder relative to the workpiece. After the new tool is aligned with the workpiece, the tool and workpiece are moved relative to each other for chip-removing machining.

EXEMPLARY OBJECTS AND SUMMARY OF THE INVENTION

It is a first object of the present invention to measure the tool force that acts during chip-removing machining of a workpiece in a cutting machine with high accuracy by means of a force transducer. It is a second object of the invention to arrange a force transducer in a space-saving way in the cutting machine for measuring the tool force that acts during the chip-removing machining of a workpiece. In addition, it is a third object of the invention to measure the tool force that acts during chip-removing machining of a workpiece by means of a force transducer in a cost-effective manner.

At least one of these objects has been achieved by the features described more fully below.

The invention includes a cutting machine that is configured to use a plurality of required tools in a chronological sequence of manufacturing steps for chip-removing machining of a workpiece. In each manufacturing step, a required tool is employed to exert a tool force onto the workpiece. The cutting machine includes a tool holder that is configured for holding the required tools all at the same time. The cutting machine includes a tool slide that is configured for moving the tool holder in a manner enabling one of the required tools to be aligned with a workpiece to perform a required function in each manufacturing step, and the tool slide is configured to enable the required tool and the workpiece to be moved relative to one another for chip-removing machining. The tool holder includes at least two single-component force transducers. The single-component force transducers are configured and disposed to measure a tool force exerted by one of the required tools during the chip-removing machining of a workpiece in the direction of the main force connection, which is the direction along which the largest component of force is directed during chip-removing machining of the workpiece.

The invention also relates to a use of such a cutting machine.

The invention also relates to a method of calibrating the force transducer of such a cutting machine.

Further advantageous solutions of the object have been achieved by the features described below.

BRIEF DESCRIPTION OF THE DRAWINGS

In the following, the invention will be described by way of example with reference to the drawings in which.

Throughout the drawings, the same features are always designated by the same reference numerals.

DETAILED DESCRIPTION OF EXEMPLARY EMBODIMENTS OF THE INVENTION

Figure 2:
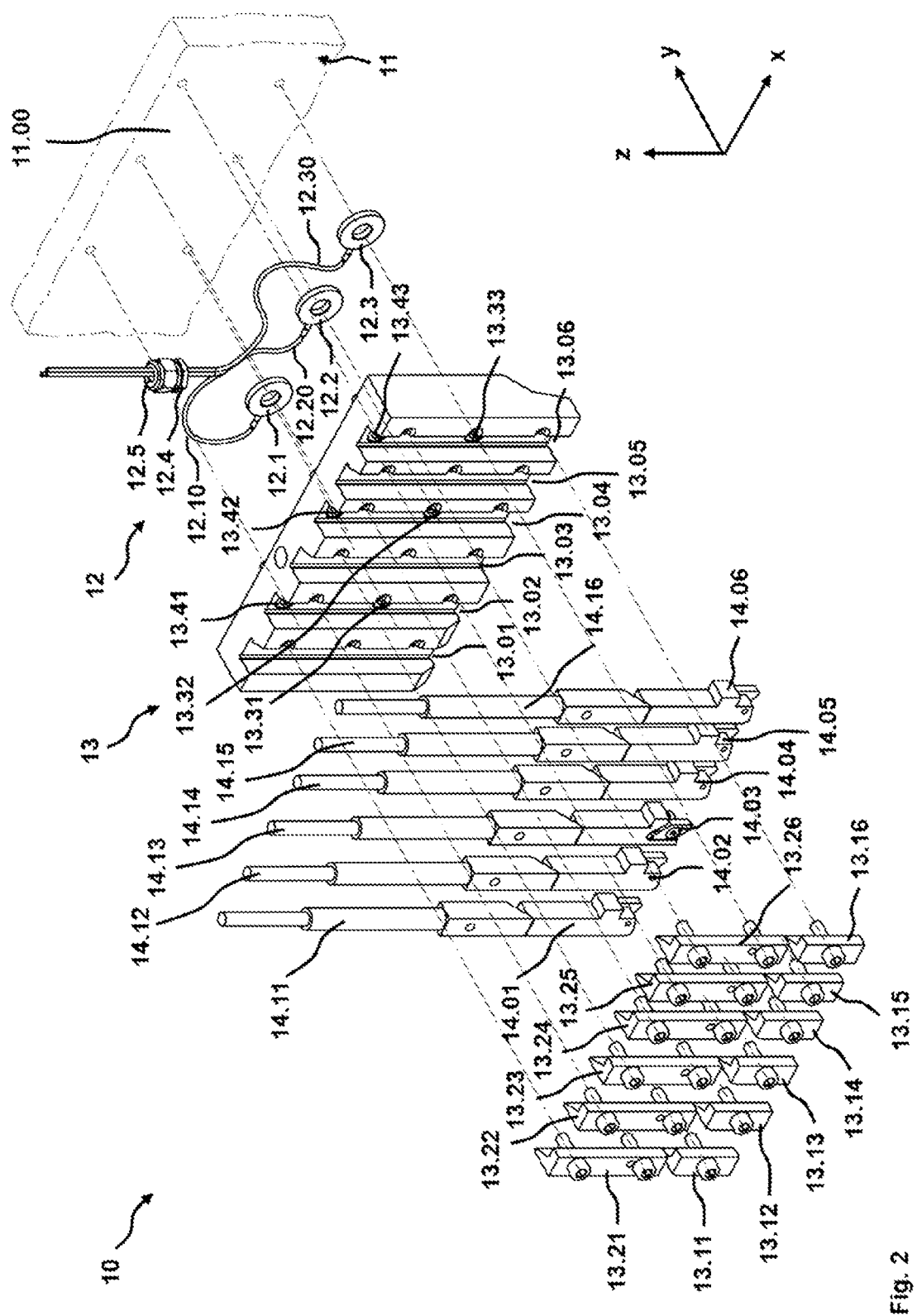
FIG. 2 shows an exploded perspective view of portions of the cutting machine according to FIG. 1.
Figure 3:
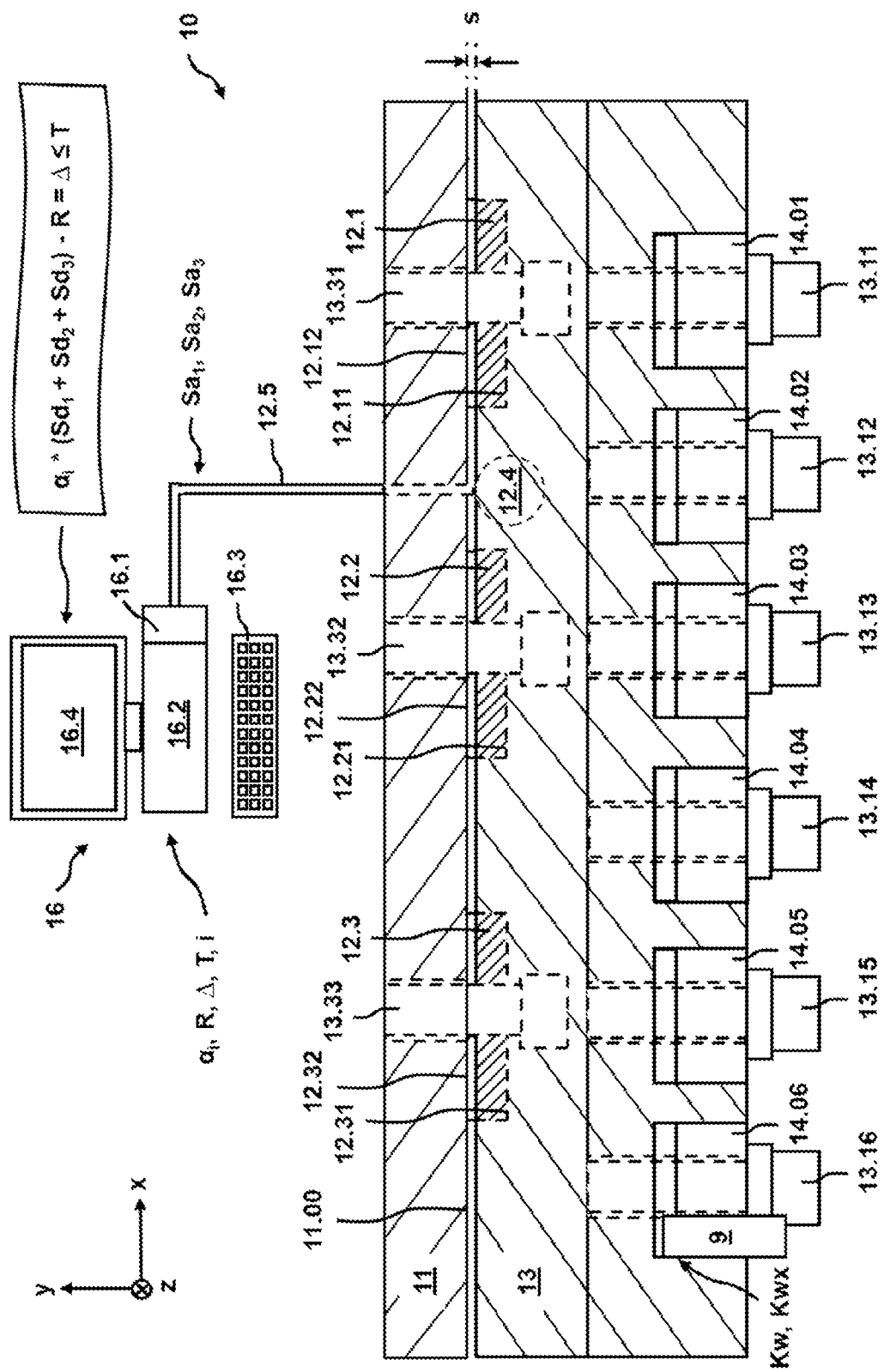
FIG. 3 schematically shows portions of the cutting machine according to FIG. 1 in a sectional view along a line ZZ' in the XY plane and from the viewer's perspective looking down onto the cutting machine 10 from above.
Figure 4:
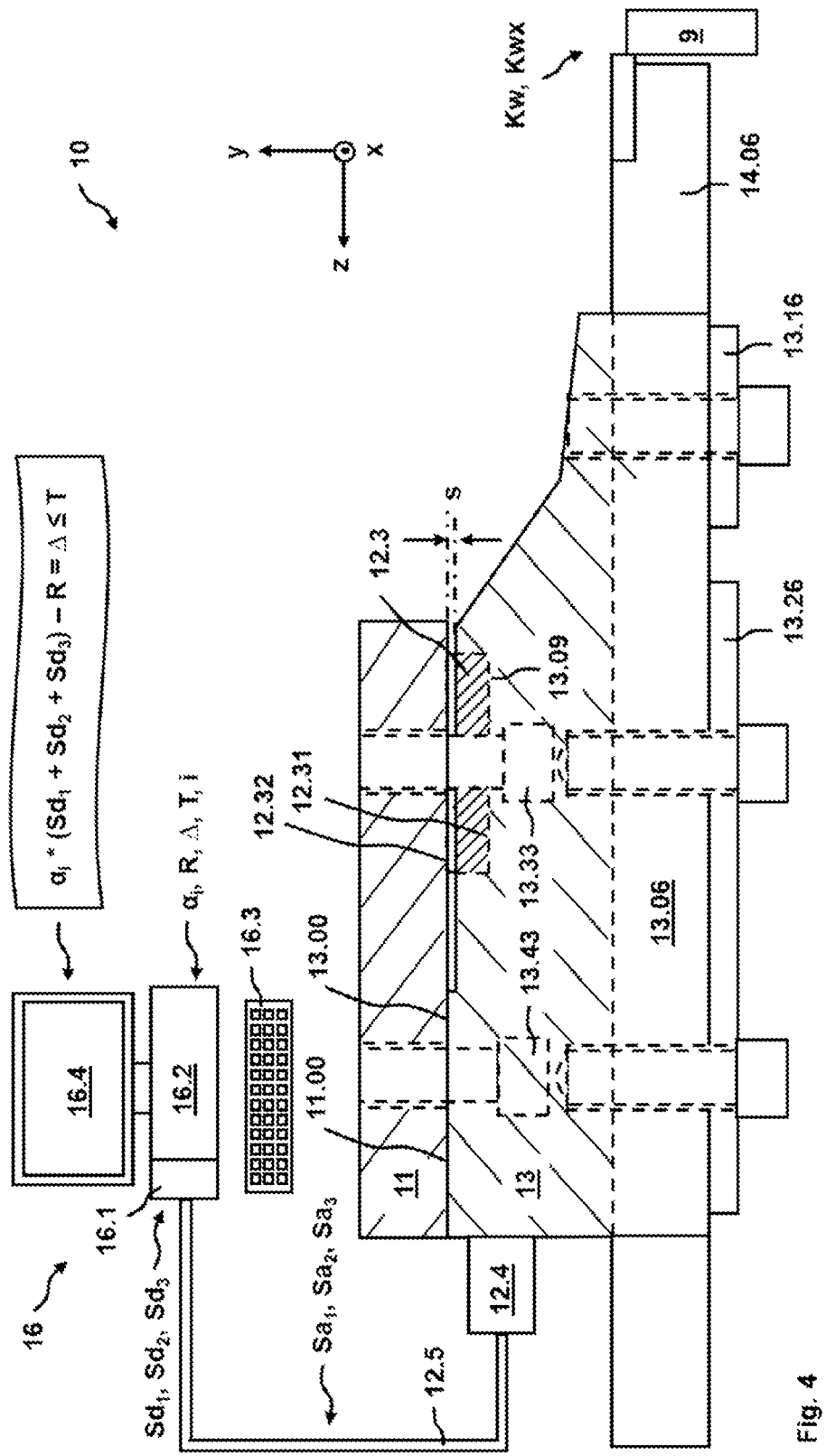
FIG. 4 schematically shows portions of the cutting machine according to FIG. 1 in a sectional view along a line XX' in the YZ plane and rotated 90° counterclockwise from the vertical direction along the z axis.

FIGS. 1-4 show portions of an embodiment of a cutting machine that is generally designated by the numeral 10 for chip-removing machining of a workpiece 9, which is schematically shown in FIG. 4. The cutting machine 10 is arranged in an orthogonal coordinate system with three axes x, y, z, the three axes are also referred to as the transverse axis x, horizontal axis y, and vertical axis z.

The workpiece 9 consists of any material such as metal, wood, plastics, etc.

Figure 1:
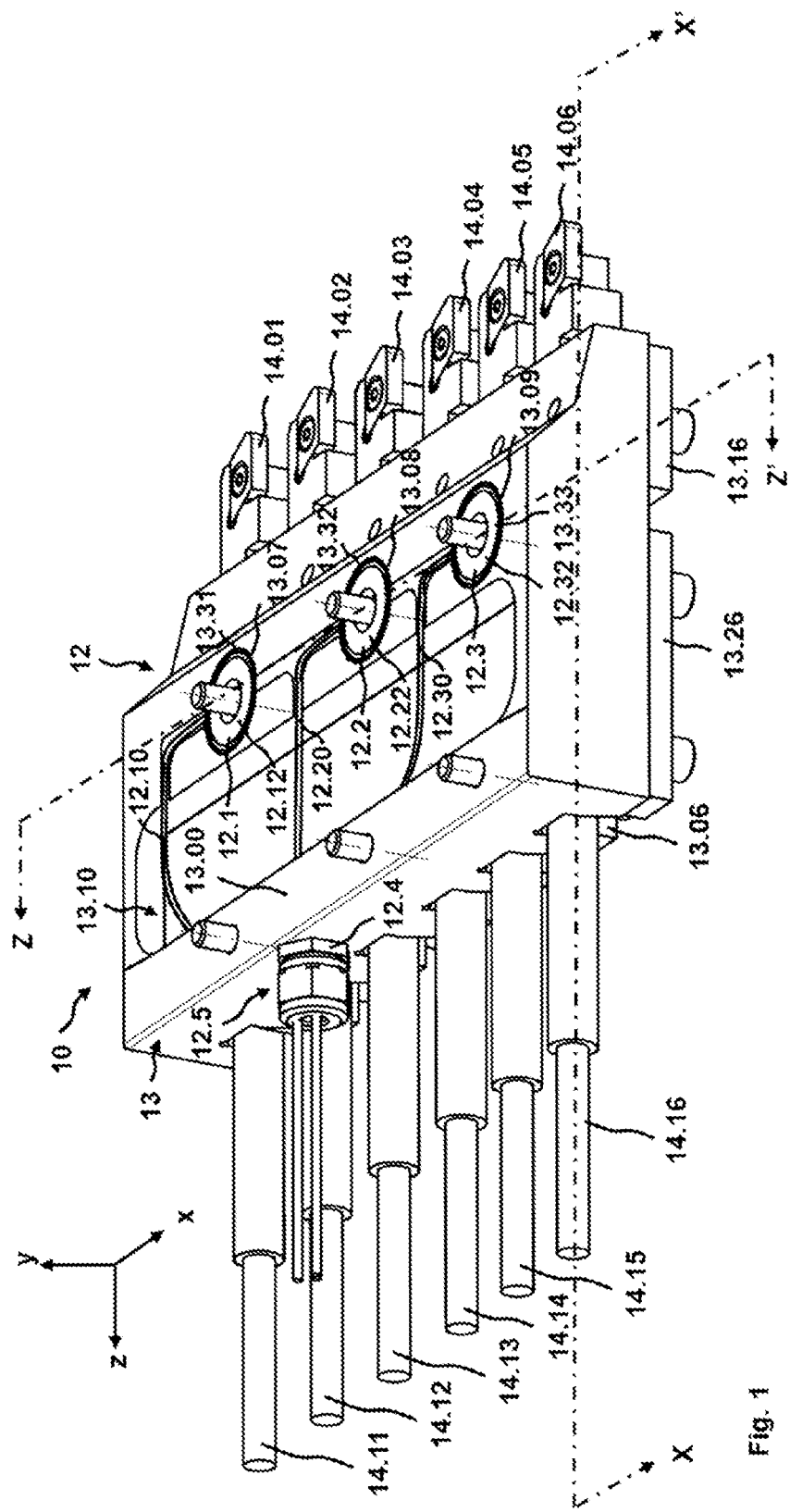
FIG. 1 shows a perspective view of an embodiment of portions of a cutting machine comprising a tool holder and a force transducer rotated 90° counterclockwise from the vertical direction along the z axis.

As shown in FIGS. 1-3, cutting machine 10 comprises a plurality of required tools 14.01-14.06. For purposes of illustration, the cutting machine 10 desirably can be considered to be a lathe that rotates a workpiece 9 while removing material from the rotating workpiece 9 by alternately moving each tool 14.01-14.06 held by the lathe in a single forward direction toward the rotating workpiece 9. By means of the required tools 14.01-14.06, the chip-removing machining of the workpiece 9 takes place in a chronological sequence of processing steps. Each of the required tools 14.01-14.06 performs a different machining function in the sequence of steps needed to machine the workpiece 9. In the example as shown in FIGS. 1-4, six tools 14.01-14.06 are required in six processing steps. A first tool 14.01 is required in a first manufacturing step, a second tool 14.02 is required in a second manufacturing step, a third tool 14.03 is required in a third manufacturing step, a fourth tool 14.04 is required in a fourth manufacturing step, a fifth tool 14.05 is required in a fifth manufacturing step, and a sixth tool 14.06 is required in a sixth manufacturing step. In a presently preferred embodiment, and as shown in FIGS. 1 and 2 for example, each respective required tool 14.01-14.06 has a respective coolant supply 14.11-14.16 that dissipates heat generated when the respective tool 14.01-14.06 engages the workpiece 9 in performance of chip-removing machining.

During chip-removing machining of the workpiece 9, the required tools 14.01-14.06 perform a cutting movement in a transverse plane xz spanned by the transverse axis x and the vertical axis z. Moreover, during chip-removing machining of the workpiece 9, the required tools 14.01-14.06 perform a forward feed movement along the horizontal axis y. As schematically shown in FIG. 4 for example, the workpiece 9 desirably is rotating about a rotational axis, which is disposed to lie parallel to the horizontal y axis, as the tool 14.06 and workpiece 9 move towards each other. In the process, the required tools 14.01-14.06 exert a tool force Kw onto the workpiece 9. The tool force Kw includes three force components. Due to the cutting movement, the tool force Kw has a main cutting force component Kwx in the direction of the transverse axis x and a passive force component Kwz in the direction of the vertical axis z. Furthermore, due to the forward feed movement along the horizontal y axis, the tool force Kw has a forward feed force component Kwy in the direction of the horizontal axis y. The main cutting force component Kwx is the largest force component in terms of amount in the different types of chip-removing machining. Moreover, when comparing the force components of the different types of chip-removing machining to each other, the amount of the main cutting force component Kwx varies the least during each chip-removing machining performed by each respective tool 14.01-14.06. Thus, the main cutting force component Kwx is suitable as an indicator for the abrasion of the tools required for different types of chip-removing machining 14.01-14.06.

The cutting machine 1 comprises a tool holder 13. The tool holder 13 holds the tools 14.01-14.06 required for the manufacturing steps in different positions i, i=1 ... 6. Before the chip-removing machining operation is started, the tool holder 13 is loaded with all the required tools 14.01-14.06, and afterwards the tool holder 13 holds the required tools 14.01-14.06 all at the same time. The tool holder 13 is made of mechanically resistant material such as steel, tool steel, etc. In the example according to FIGS. 1-4, the tool holder 13 holds six required tools 14.01-14.06.

The tool holder 13 holds the required tools 14.01-14.06 by a shaft of the required tools 14.01-14.06. To this end, the tool holder 13 comprises a plurality of tool recesses 13.01-13.06 and a plurality of retaining means 13.11-13.16, 13.21-13.26.

In a presently preferred embodiment, each of six tool recesses 13.01-13.06 accommodates a shaft of any of the six required tools 14.01-14.06. The retaining means 13.11-13.16, 13.21-13.26 desirably are screw connections comprising retaining plates, bores in the retaining plates, retaining screws and internal threads in the tool holder 13. Each of the tool recesses 13.01-13.06 is associated with a first retaining means 13.11-13.16 and a second retaining means 13.21-13.26. The tool recess 13.06, first retaining means 13.16 and second retaining means 13.26 that respectively receives and retain the shaft of the required tool 14.06 is schematically shown in FIG. 4 for example. In a presently preferred embodiment, each first retaining means 13.11-13.16 comprises a retaining plate and a retaining screw, and each second retaining means 13.21-13.26 comprises a retaining plate and two retaining screws. Each first retaining means 13.11-13.16 rests with a retaining plate on the shaft of a required tool 14.01-14.06, and each of the second retaining means 13.21-13.26 rests with a retaining plate on the shaft of a required tool 14.01-14.06. External threads of the retaining screws extend through the bores in the retaining plates up to the internal threads in the tool holder 13. The screws are connected in parallel to the horizontal axis y. After the external threads are screwed into the internal threads the retaining screws press the retaining plates against the shaft of the required tools 14.1-14.8 and hold the required tools 14.01-14.06 in the tool recesses 13.01-13.06 by a holding force.

The cutting machine 1 comprises a tool slide 11. The tool slide 11 carries the tool holder 13. According to the principle of action and reaction, and as schematically shown in FIGS. 3 and 4 for example, the tool slide 11 receives the tool force Kw from the tool holder 13 and exerts a reaction force of the same amount but acting in the opposite direction onto the tool holder 13.

The tool holder 13 equipped with the required tools 14.01-14.06 can be easily and quickly fastened to the tool slide 11 and removed from the tool slide 11 via the three first fastening means 13.31, 13.32, 13.33 and the three second fastening means 13.41, 13.42, 13.43. In a presently preferred embodiment, the tool holder 13 comprises three first fastening means 13.31, 13.32, 13.33 and three second fastening means 13.41, 13.42, 13.43 as schematically shown in FIG. 2 for example. The fastening means 13.31, 13.32, 13.33, 13.41, 13.42, 13.43 are screw connections comprising fastening screws, bores in the tool holder 13 and internal threads in the tool slide 11. The screws are connected in parallel to the horizontal axis y. The external threads of the fastening screws extend through the bores in the tool holder 13 up to the internal threads in the tool slide 11. The screw heads of the fastening screws rest in the tool holder 13. After the external threads are screwed into the internal threads in the tool slide 11, the fastening screws press the tool holder 13 against the tool slide 11 by a fastening force and so fastens the tool slide 11 and tool holder 13 together as an integrated unit.

The tool slide 11 moves the tool holder 13. For this purpose, the tool slide 11 comprises a drive unit such as an electric drive unit, a pneumatic drive unit, etc. The drive unit moves the tool holder 13 along the three axes x, y and z.

The cutting machine 1 comprises a force transducer 12. According to the invention, the force transducer 12 consists of at least two single-component force transducers 12.1, 12.2, 12.3. In the example according to FIGS. 1-4, the force transducer 12 consists of three single-component force transducers 12.1, 12.2, 12.3.

Each single-component force transducer 12.1, 12.2, 12.3 comprises a housing made of mechanically resistant material such as steel, tool steel, etc. Each single-component force transducer 12.1, 12.2, 12.3 is hollow cylindrical in shape and comprises two housing end faces, two lateral surfaces and a central housing bore. The housing end faces are disposed to lie parallel to a vertical plane xz. An outer lateral surface delimits the housing in a radial direction away from the housing bore. An inner lateral surface delimits the housing at the housing bore. A longitudinal axis of the housing bore is disposed to lie parallel to the horizontal axis y.

The single-component force transducer 12.1, 12.2, 12.3 is spatially arranged between the tool holder 13 and the tool slide 11. FIG. 4 schematically shows a cross-sectional view of the single-component force transducers 12.3 disposed between the tool holder 13 and the tool slide 11. In the example according to FIGS. 1-4 and 6, three single-component force transducers 12.1, 12.2, 12.3 are arranged on a line ZZ' schematically shown in FIG. 1 extending along the transverse axis x.

The tool holder 13 holds each single-component force transducer 12.1, 12.2, 12.3. For this purpose, the tool holder 13 defines a plurality of recesses 13.07-13.09. The recesses 13.07-13.09 are arranged in parallel to the vertical plane xz. The size of a diameter of the recesses 13.07-13.09 is such that each respective one of the single-component force transducers 12.1, 12.2, 12.3 can be inserted into a respective one of the recesses 13.07-13.09 and the inserted single-component force transducers 12.1, 12.2, 12.3 are held within the respective volumes defined by the recesses 13.07-13.09 via radially outer lateral surfaces of the respective single-component force transducers 12.1, 12.2, 12.3. A first recess 13.07 holds the first single-component force transducer 12.1, a second recess 13.08 holds the second single-component force transducer 12.2, and a third recess 13.09 holds the third single-component force transducer 12.3. This configuration holding of the single-component force transducers 12.1, 12.2, 12.3 in the recesses 13.07-13.09 is space-saving and cost-effective because the given external dimensions of a conventional tool holder can thus be retained and do not have to be changed.

As schematically shown in FIGS. 3 and 4 for example, in the area of the recesses 13.07-13.09, the tool holder 13 fastened to the tool slide 11 desirably is spaced apart from the tool slide 11 by a gap that is designated by the lower case letter "s". As schematically shown in FIG. 4 for example, in the neighborhood of each of the second fastening means 13.41, 13.42, 13.43, the tool holder 13 fastened to the tool slide 11 is in planar contact with the tool slide 11 via a contact surface 13.00.

Each of the respective single-component force transducers 12.1, 12.2, 12.3 inserted into the respective one of the recesses 13.07-13.09 defined in the tool holder 13 is fastened to the tool slide 11 via a respective one of the first fastening means 13.31-13.33. The first fastening means 13.31-13.33 desirably are screw connections comprising fastening screws and internal threads defined internally in the tool slide 11. The size of a diameter of the housing bore is such that the fastening screw projects through it. External threads of the fastening screws extend through the housing bores of the single-component force transducer 12.1, 12.2, 12.3 up to the internal threads in the tool slide 11. Screw heads of the fastening screws rest in the tool holder 13. After the external threads are screwed into the internal threads in the tool slide 11, the fastening screws press the single-component force transducer 12.1, 12.2, 12.3 against the tool slide 11 by means of the fastening force effected by the fastening screws. This fastening of each of the single-component force transducers 12.1, 12.2, 12.3 between the tool holder 13 and the tool slide 11 is inelastic and has the advantage that the action of the tool force Kw to be measured onto the single-component force transducers 12.1, 12.2, 12.3 is substantially undampened. This feature of the present invention contrasts with any elastic deformation, which dampens the tool force Kw and accordingly falsifies the measurement of the tool force Kw.

A suitable single-component force transducer 12.1, 12.2, 12.3 of this type is disclosed shaped like a flat torus and described in applicant's commonly owned U.S. Pat. No. 5,297,430, which is hereby incorporated herein in its entirety by this reference for all purposes. A more recently updated version of suitable single-component force transducers 12.1, 12.2, 12.3 of this type is commercially available from the applicant with the type designation 9145B with the data sheet 9143B_000-113d-03.16. The desired single-component force transducer 12.1, 12.2, 12.3 has an outer diameter of 24.0 mm delimited by the outer lateral surface thereof, an inner diameter of 10.1 mm delimited by the inner lateral surface thereof, and a height of only 3.5 mm along the y-axis between the housing end faces.

In comparison to the multi-component force transducer with the type designation 9027C mentioned in the Background and having a height of 12.0 mm, each of the single-component force transducers 12.1, 12.2, 12.3 with the type designation 9145B has a height along the y-axis that is more than three times smaller. The section drawn to scale according to FIG. 4 shows that there is no space in the tool holder 13 for a multi-component force transducer having a height that is more than three times greater along the y-axis for holding it there in a recess and for pressing it against the tool slide 11 by first fastening means.

Each respective first housing end face 12.11, 12.21, 12.31 of each single-component force transducer 12.1, 12.2, 12.3 is disposed to rest against the blind end of each respective recess 13.07, 13.08, 13.09 defined in the tool holder 13 and thus is disposed in planar contact with the tool holder 13. As schematically shown in FIGS. 3 and 4 for example, the depth in the direction of the y axis of each respective recess 13.07, 13.08, 13.09 defined in the tool holder 13 is less than the height of each respective single-component force transducer 12.1, 12.2, 12.3 disposed therein. Accordingly, each respective second housing end face 12.12, 12.22, 12.32 of each respective single-component force transducer 12.1, 12.2, 12.3 projects out of its respective recess 13.07, 13.08, 13.09 and thus is disposed in planar contact with the tool slide 11 via the respective second housing end face 12.12, 12.22, 12.32. Due to the fact that the contact surface 13.00 of the tool holder 13 is spaced apart from the tool slide 11 by the gap "s" in the area of the recesses 13.07-13.09, only each of the respective single-component force transducers 12.1, 12.2, 12.3 is in planar contact with the tool slide 11 in the area of the recesses 13.07-13.09 via its second housing end faces 12.12, 12.22, 12.32.

In a presently preferred embodiment, a sum of the areas of the second housing end faces 12.12, 12.22, 12.32 of the at least two single-component force transducers 12.1, 12.2, 12.3 is larger than the area of the contact surface 13.00 of the tool holder 13. Thus, a major fraction of the tool force Kw to be measured, acts onto the tool slide 11 by the sum of the housing end faces 12.12, 12.22, 12.32. Only a small fraction of the tool force Kw to be measured, acts onto the tool slide 11 via the contact surface 13.00. Therefore, the spatial disposition of the at least two single-component force transducers 12.1, 12.2, 12.3 between the tool holder 13 and the tool slide 11 can be considered to be the main force connection, which accounts for the majority of the tool force Kw.

In a presently preferred embodiment, the at least two single-component force transducers 12.1, 12.2, 12.3 are arranged at a shorter distance to the required tools 14.01-14.06 than the contact surface 13.00. For example, in the section drawn to scale according to FIG. 4 the distance from the single-component force transducer 12.3 to the required tool 14.06 is only 66% of the distance from the contact surface 13.00 to the required tool 14.06. Consequently, the largest fraction of the tool force Kw to be measured acts onto the at least two single-component force transducers 12.1, 12.2, 12.3, and only a small fraction of the tool force Kw to be measured acts onto the contact surface 13.00. This is another reason why the spatial arrangement of the at least two single-component force transducers 12.1, 12.2, 12.3 between the tool holder 13 and the tool slide 11 is responsible for the force main connection that affects the measurement of the tool force Kw.

This force main connection will not be achieved if a single multi-component force transducer is used instead of the at least two single-component force transducers 12.1, 12.2, 12.3. The reason is that the multi-component force transducer with the type designation 9027C mentioned in the Background and the single-component force transducer 12.1, 12.2, 12.3 with the type designation 9145B have the same outer diameter of 24.0 mm. Thus, the second housing end face of the multi-component force transducer would be smaller than the contact surface 13.00 of the tool holder 13 and the spatial arrangement of the multi-component force transducer between the tool holder 13 and the tool slide 11 would be in the force shunt.

Moreover, the size of a total contact surface consisting of the second housing end faces 12.12, 12.22, 12.32 of the at least two single-component force transducers 12.1, 12.2, 12.3 and the contact surface 13.00 of the tool holder 13 is at least half the size of a total contact surface 11.00 of the tool slide 11 in the vertical plane xz. Thus, the tool holder 13 and the tool slide 11 are in contact with each other over a large portion of their surfaces, which has the advantage that the cutting machine 10 is highly rigid. Such high rigidity opposes mechanical deflection in the vertical plane xz, and thus imposes a high natural frequency. This advantage is also not achieved when using a single multi-component force transducer instead of the at least two single-component force transducers 12.1, 12.2, 12.3. This difference is due to the fact that the multi-component force transducer having the type designation 9027C mentioned in the Background and the single-component force transducer 12.1, 12.2, 12.3 with the type designation 9145B have the same outer diameter of 24.0 mm. In the case of the multi-component force transducer, the size of the total contact surface consisting of the second housing end face of the multi-component force transducer and the contact surface 13.00 of the tool holder 13 would be less than half the size of a total contact surface 11.00 of the tool slide 11 in the vertical plane xz.

Each of the single-component force transducers 12.1, 12.2, 12.3 desirably is a piezoelectric force transducer comprising piezoelectric material made of a single crystal such as quartz ($SiO_2$), calcium gallo-germanate ($Ca_3Ga_2Ge_4O_{14}$ or CGG), langasite ($La_3Ga_5SiO_{14}$ or LGS), tourmaline, gallium orthophosphate, etc. and from piezoceramics such as lead zirconate titanate ($Pb[Zr_xTi_{1-x}]O_3$, $0 \le x \le 1$), etc.

The piezoelectric material is hollow-cylindrical in shape having end faces that are arranged in parallel to the housing end faces and, thus, in parallel to the transverse plane xz. Thus, the tool force Kw to be measured acts onto the end faces of the piezoelectric material. The piezoelectric material is oriented in such a way that it has a maximum sensitivity to the tool force Kw to be measured on the end faces onto which the tool force Kw acts. In the sense of the present invention, the sensitivity is a ratio of the number of electric polarization charges generated under the effect of the tool force Kw to the tool force Kw acting on the piezoelectric material. With the highest sensitivity, the piezoelectric material will generate the largest number of electric polarization charges. Piezoelectric material from a single crystal is therefore cut into hollow cylinders in such an orientation that it generates the greatest number of electrical polarization charges for a tool force Kw acting onto the end faces. For this reason, piezoelectric material made of piezoceramics is polarized in an electric field and formed into a hollow-cylindrical shape by mechanical pressing in such a way that it generates the greatest number of electric polarization charges for a tool force Kw acting onto the end faces.

In a presently preferred embodiment, the at least two single-component force transducers 12.1, 12.2, 12.3 measure the same force component of the tool force Kw. In a presently preferred embodiment, the force component of the main cutting force is measured in the x-direction. In the following explanation, the force component of the main cutting force in the x-direction is also called the main cutting force component Kwx. For this purpose, each of the at least two single-component force transducers 12.1, 12.2, 12.3 has piezoelectric material which is oriented in such a way that it generates electrical polarization charges with maximum sensitivity for the main cutting force component Kwx. Thus the main cutting force component Kwx is measured in a redundant manner. In the example according to FIGS. 1-4, three single-component force transducers 12.1, 12.2, 12.3 are arranged with their housing end faces in parallel to the vertical plane xz. Each of the three single-component force transducers 12.1, 12.2, 12.3 measures the same main cutting force component Kwx according to the transversal shear effect as a shear force along the transverse axis x.

The measurement of the tool force Kw is specific for a position i of the required tool 14.01-14.06. In the example according to FIGS. 1-4, the tool holder 13 holds six required tools 14.01-14.06 in six different positions i, i=1 . . . 6 and the cutting machine 1 comprises three single-component force transducers 12.1, 12.2, 12.3. Each of the six required tools 14.01-14.06 is located at a different distance from each of the three single-component force transducers 12.1, 12.2, 12.3. The different distances of each of the required tools 14.01-14.06 to each of the single-component force transducers 12.1, 12.2, 12.3 result in the force flow of the tool force Kw being specific for position i of the required tool 14.01-14.06 with respect to each of the single-component force transducers 12.1, 12.2, 12.3 and cause each of the single component force transducers 12.1, 12.2, 12.3 to measure a slightly different amount of the tool force Kw. Typically, the amount of the tool force Kw measured varies in a range from 0.75 to 1.25. This positional specificity during the measurement of the tool force Kw is reduced by the redundant measurement of the tool force Kw performed by at least two single-component force transducers 12.1, 12.2, 12.3. This is due to the fact that the measurement signals of the single-component force transducers 12.1, 12.2, 12.3 are added up to obtain a position-specifically averaged measurement signal.

The electrical polarization charges must be picked off from the end faces. For this purpose, each single-component force transducer 12.1, 12.2, 12.3 comprises electrodes. The electrodes are made of electrically conductive material such as copper, gold, etc. and are hollow-cylindrical in shape. One electrode each is arranged directly on one of the end faces of the piezoelectric material.

In the first single-component force transducer 12.1, a first signal electrode picks up electrical polarization charges as analog measurement signals Sa1 from first end faces and a first ground electrode picks up electrical polarization charges from second end faces. In the second single-component force transducer 12.2, a second signal electrode picks up electrical polarization charges as analog measurement signals $Sa_2$ from first end faces and a second ground electrode picks up electrical polarization charges from second end faces. And in the third single-component force transducer 12.3, a third signal electrode picks up electrical polarization charges as analog measurement signals $Sa_3$ from first end faces and a third ground electrode picks up electrical polarization charges from second end faces. The analog measurement signals $Sa_1$, $Sa_2$, $Sa_3$ are proportional to the amount of the tool force Kw.

The three signal electrodes are electrically insulated from the housing, and the three ground electrodes are electrically connected to the housing and are located on the electrical ground potential of the housing. Since all of the three ground electrodes are on the same electrical ground potential, they are designated by the same reference numeral.

The single-component force transducer 12.1, 12.2, 12.3 is electrically connected to a signal socket 12.4 via signal lines 12.10, 12.20, 12.30. A first signal line 12.10 connects the first signal electrode of the first single-component force transducer 12.1 to the signal socket 12.4, a second signal line 12.20 connects the second signal electrode of the second single-component force transducer 12.2 to the signal socket 12.4, and a third signal line 12.30 connects the third signal electrode of the third single-component force transducer 12.3 to the signal socket 12.4. The three signal lines 12.10, 12.20, 12.30 are introduced in at least one cavity 13.10 of the tool holder 13. In a presently preferred embodiment, the cavity 13.10 is sealed to the outside by the tool holder 13 when the tool holder 13 is fastened to the tool slide 11. This sealing protects the signal lines 12.10, 12.20, 12.30 introduced in the cavity 13.10 from adverse external impacts during chip-removing machining. As schematically shown in FIG. 1, the signal socket 12.4 is attached to the outside of the tool holder 13.

A signal cable 12.5 can be electrically connected to the signal socket 12.4 from the outside. Each time the tool holder 13 is attached to the tool slide 11, the signal cable 12.5 is also easily and quickly electrically connected to the signal socket 12.4 via a quick release coupling. On the other hand, when the tool holder 13 is removed from the tool slide 11, the signal cable 12.5 is also easily and quickly electrically disconnected from the signal socket 12.4 via the quick release coupling. The signal cable 12.5, which is in electrical contact with the signal socket 12.4, conducts the analog measurement signals $Sa_1$, $Sa_2$, $Sa_3$ from the signal socket 12.4 to an evaluation unit 16, which is shown schematically in FIGS. 3 and 4 for example.

For each manufacturing step by means of a required tool 14.01-14.06, the first single-component force transducer 12.1 generates first analog measurement signals $Sa_1$ for the main cutting force component Kwx. For each manufacturing step by means of a required tool 14.01-14.06, the second single-component force transducer 12.2 generates second analog measurement signals $Sa_2$ for the main cutting force component Kwx. And for each manufacturing step by means of a required tool 14.01-14.06, the third single-component force transducer 12.3 generates third analog measurement signals $Sa_3$ for the main cutting force component Kwx. Each manufacturing step lasts 1 sec to 100 sec. The single-component force transducers 12.1, 12.2, 12.3 generate the analog measurement signals $Sa_1$, $Sa_2$, $Sa_3$ with a time resolution in a frequency range from 1 kHz to 50 kHz.

To ensure that the electrodes pick off all electrical polarization charges generated from the end faces of the piezoelectric material, and ensure that no electrical polarization charges remain on the end faces of the piezoelectric material and thereby falsify the measurement of the tool force Kw, the electrodes are mechanically biased against the end faces of the piezoelectric material. Mechanical biasing of the single-component force transducer 12.1, 12.2, 12.3 closes micropores between the electrodes and the end faces of the piezoelectric material. The mechanical biasing of the single-component force transducer 12.1, 12.2, 12.3 inserted into the recesses 13.07-13.09 is performed by fastening the tool holder 13 to the tool slide 11 by the first fastening means 13.31, 13.32, 13.33.

As shown schematically in FIGS. 3 and 4 for example, the evaluation unit 16 comprises at least one converter unit 16.1, at least one computer 16.2, at least one input unit 16.3, and at least one output unit 16.4.

The single-component force transducer 12.1, 12.2, 12.3 is electrically connected to the converter unit 16.1 via the signal cable 12.5. The converter unit 16.1 converts analog measurement signals $Sa_1$, $Sa_2$, $Sa_3$ transmitted by the signal electrodes into digital measurement signals $Sd_1$, $Sd_2$, $Sd_3$.

The computer 16.2 comprises at least one data processor and at least one data memory. The computer 16.2 is operable via the input unit 16.3. The input unit 16.3 may be a keyboard, for inputting control commands. In the sense of the invention, the verb "operate" means that the computer 16.2 is started, controlled and switched off by a person by means of control commands input by the input unit 16.3. The computer 16.2 imports the digital measurement signals $Sd_1$, $Sd_2$, $Sd_3$. The computer 16.2 calculates the sum of the read digital measurement signals $Sd_1$, $Sd_2$, $Sd_3$ to give a position-specifically averaged measurement signal $(Sd_1+Sd_2+Sd_3)$. The computer 16.2 displays the position-specifically averaged measurement signal $(Sd_1+Sd_2+Sd_3)$ on the output unit 16.4. The output unit 16.4 may be a screen for displaying a diagram of the evaluated digital measurement signals.

When evaluating the digital measurement signals $Sd_1$, $Sd_2$, $Sd_3$, the computer 16.2 imports reference signals R and position-specific calibration factors $\alpha_i$.

The reference signals R are specific to the material of the workpiece 9 and to the cutting material of the required tool 14.01-14.06. Important in this context are the properties of the material and of the cutting material such as strength, toughness and hardness. However, the reference signals R are also specific to the process parameters of the chip-removing machining. Such process parameters are the forward feed rate, supply, tool geometry, etc. Preferably, reference signals R for each material of the workpiece 9 and for each cutting material of the required tool 14.01-14.06 and for each process parameter of the metal-cutting shaping are stored in the data memory of the computer 16.2 and can be read out from the data memory by the computer 16.2.

To further reduce the position specificity when measuring the tool force Kw, specific calibration factors $\alpha_i$ for each position i are stored in the data memory of the computer 16.2 and can be read out from the data memory by the computer 16.2.

For performing the evaluation, the computer 16.2 calibrates the position-specifically averaged measurement signal $(Sd_1+Sd_2+Sd_3)$ of a required tool 14.01-14.06 in position i by multiplying it with a position-specific calibration factor $\alpha_i$ of position i of the required tool 14.01-14.06. For each process step, the computer 16.2 calculates a difference Δ between the position-specifically averaged measurement signal $(Sd_1+Sd_2+Sd_3)$ of position i and the read out reference signal R for the material of the workpiece 9 and the cutting material of the required tool 14.01-14.06 in position i.

For performing the evaluation, the computer 16.2 calibrates the position-specifically averaged measurement signal $(Sd_1+Sd_2+Sd_3)$ of a required tool 14.01-14.06 in position i by multiplying it with a position-specific calibration factor $\alpha_i$ of position i of the required tool 14.01-14.06. For each process step, the computer 16.2 calculates a difference Δ between the position-specifically averaged measurement signal $(Sd_1+Sd_2+Sd_3)$ of position i and the read out reference signal R for the material of the workpiece 9 and the cutting material of the required tool 14.01-14.06 in position i.

$$\alpha_i*(Sd_1+Sd_2+Sd_3)-R=\Delta \leq T=10\%*R$$

At least one predefined tolerance value T is stored in the data memory of the computer 16.2, which predefined tolerance value T is read out for each manufacturing step.

For each manufacturing step, the difference Δ is compared to the predefined tolerance value T. If the difference Δ is smaller than/equal to the predefined tolerance value T, then it is concluded that the required tool 14.01-14.06 is not abraded and it will continue to be used. However, if the difference Δ is larger than the predefined tolerance size T, then it is concluded that the required tool 14.01-14.06 is abraded and it will be replaced. As a first approximation, the predefined tolerance value T is equal to 10% of the reference signal R.

Figure 5:
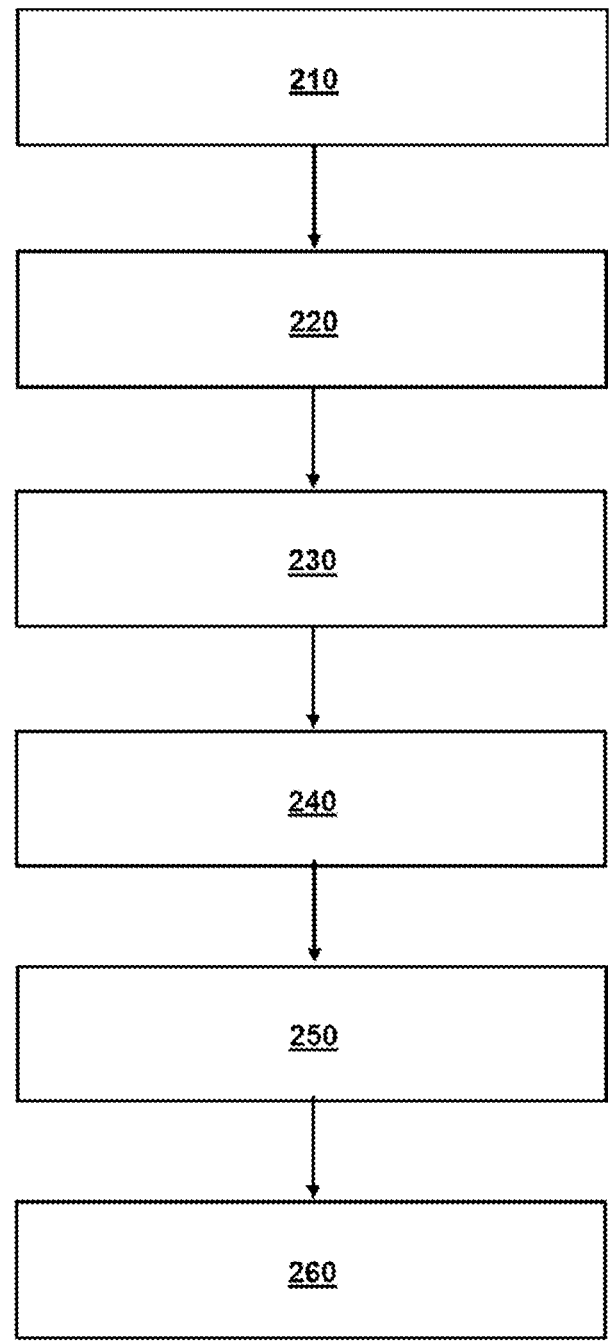
FIG. 5 schematically shows a flow chart of process steps for the calibration of the force transducer of the cutting machine according to FIG. 1.
Figure 6:
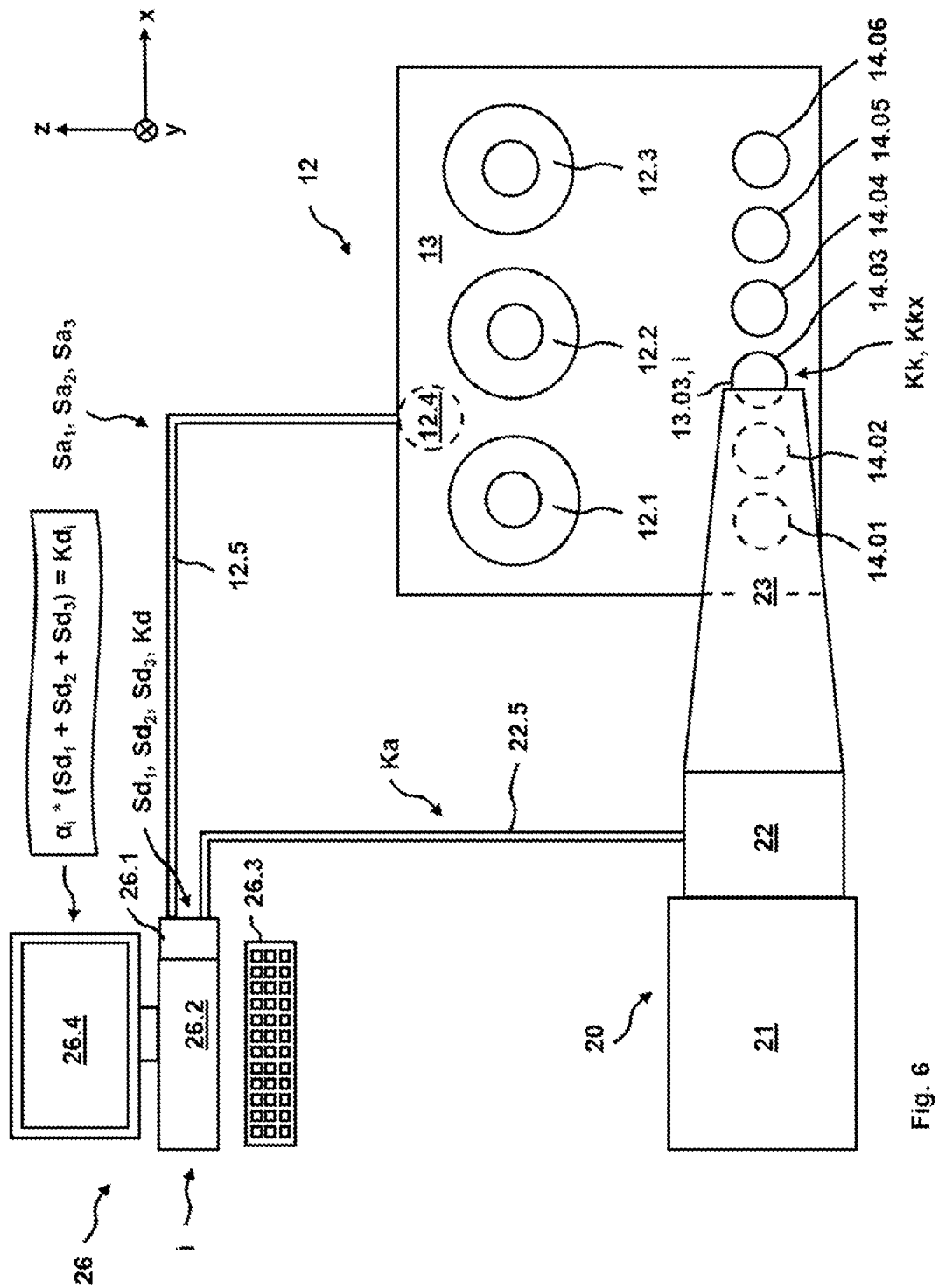
FIG. 6 schematically shows portions of an embodiment of a calibrating device for carrying out the process steps according to FIG. 5 on the tool holding device of the cutting machine according to FIG. 1.

FIG. 5 shows a flow chart of process steps 210-260 for calibrating the single-component force transducers 12.1, 12.2, 12.3 of the cutting machine 10 according to FIG. 1. FIG. 6 shows portions of an embodiment of a calibration device 20 for carrying out the process steps according to FIG. 5 on the tool holder 13 of the cutting machine 10 according to FIG. 1.

The calibration device 20 comprises a calibration contact 23, a calibration force transducer 22, a calibration drive unit 21, and an evaluation unit 26.

In a first process step 210, a tool holder 13 is provided with at least one required tool 14.01-14.06 and with at least two single-component force transducers 12.1, 12.2, 12.3. In the example according to FIG. 6, the cutting machine 10 comprises three single-component force transducers 12.1, 12.2, 12.3.

In a further process step 220, the at least two single-component force transducers 12.1, 12.2, 12.3 are connected to the evaluation unit 26. The evaluation unit 26 comprises at least one converter unit 26.1, at least one computer 26.2, at least one input unit 26.3 and at least one output unit 26.4.

In a further process step 230, a calibration force Kk is applied to the required tool 14.01-14.06 by the calibration device 20.

The calibration device 20 comprises a calibration drive unit 21, a calibration contact 23, and a calibration force transducer 22.

The calibration drive unit 21 is an electric drive unit, a pneumatic drive unit, etc. The calibration drive unit 21 moves the calibration contact 23 and the calibration force transducer 22 along the three axes x, y and z. The calibration drive unit 21 aligns the calibration contact 23 precisely with the required tool 14.01-14.06 at a position i of the tool holder 13 and applies the calibration force Kk to the required tool 14.01-14.06. The calibration force Kk has a main cutting force calibration component Kkx in the direction of the transverse axis x.

In the example according to FIG. 6, the calibration contact 23 is finger-shaped and has a tip for exerting the calibration force Kk. The calibration contact 23 is made of mechanically resistant material such as steel, tool steel, etc.

The calibration force transducer 22 measures the main cutting force calibration component Kkx. The calibration force transducer 22 may operate according to any measuring principle. It is required for calibration, however, that the calibration force transducer 22 measures the main cutting force calibration component Kkx with an accuracy which is at least one order of magnitude larger than that of the at least two single-component force transducers 12.1, 12.2, 12.3. The calibration force transducer 22 is electrically connected to the converter unit 26.2 via a calibration signal cable 22.5.

In a further process step 240, the main cutting force calibration component Kkx is measured by the at least two single-component force transducers 12.1, 12.2, 12.3 and by the calibration force transducer 22 of the calibration device 20. In the example according to FIG. 6, the first single-component force transducer 12.1 generates first analog measurement signals $Sa_1$ for the main cutting force calibration component Kkx, the second single-component force transducer 12.2 generates second analog measurement signals $Sa_2$ for the main cutting force calibration component Kkx, and the third single-component force transducer 12.3 generates third analog measurement signals $Sa_3$ for the main cutting force calibration component Kkx. The calibration force transducer 22 generates analog calibration signals Ka for the main cutting force calibration component Kkx.

In a further process step 250, analog measurement signals $Sa_1$, $Sa_2$, $Sa_3$ of the at least two single-component force transducers 12.1, 12.2, 12.3 and analog calibration signals Ka of the calibration force transducer 22 are transmitted to the evaluation unit 26.

The converter unit 26.1 converts the transmitted analog measurement signals $Sa_1$, $Sa_2$, $Sa_3$ into digital measurement signals $Sd_1$, $Sd_2$, $Sd_3$. In the embodiment according to FIG. 6, the converter unit 26.1 converts first analog measurement signals $Sa_1$ into first digital measurement signals $Sd_1$, the converter unit 26.1 converts second analog measurement signals $Sa_2$ into second digital measurement signals $Sd_2$, and the converter unit 26.1 converts third analog measurement signals $Sa_3$ into third digital measurement signals $Sd_3$.

The converter unit 26.1 converts analog calibration signals Ka transmitted from the calibration force transducer 22 via the signal cable 22.14 to digital calibration signals Kd.

In a further process step 260, the digital measurement signals $Sd_1$, $Sd_2$, $Sd_3$ and the digital calibration signals Kd are compared in the evaluation unit 26.

The computer 26.2 comprises at least one data processor and at least one data memory. The computer 26.2 may be operated via the input unit 26.3. The input unit 26.3 may be a keyboard, for inputting control commands. In the sense of the invention, the verb "operate" means that the computer 26.2 is started, controlled and switched off by a person by means of control commands input by the input unit 26.3. The computer 26.2 imports the digital measurement signals $Sd_1$, $Sd_2$, $Sd_3$ and the digital calibration signals Kd. The computer 26.2 sums up the digital measurement signals $Sd_1$, $Sd_2$, $Sd_3$ to obtain a position-specifically averaged measurement signal $(Sd_1+Sd_2+Sd_3)$. The computer 26.2 displays the position-specifically averaged measurement signal $(Sd_1+Sd_2+Sd_3)$ on the output unit 26.4. The output unit 26.4 may be a screen for displaying a diagram of the evaluated digital measurement signals.

The computer 26.2 compares digital measurement signals $Sd_1$, $Sd_2$, $Sd_3$ with digital calibration signals Kd. The comparison is performed specifically for a position i of a required tool 14.01-14.06. The information with respect to the position i can be entered via the input unit 26.3. In the example according to FIG. 6, the calibration contact 23 exerts a calibration force Kk onto a third required tool 14.3 arranged in a third tool recess 13.03. The third tool recess 13.03 corresponds to the third position i=3, and the required tool 14.3 is located in the third position i=3**.

The computer 26.2 compares a position-specifically averaged measurement signal $(Sd_1+Sd_2+Sd_3)$ of position i to a digital calibration signal Kd of position i. A result of this comparison is a calibration factor $\alpha_i$ of position i:

$$\alpha_i*(Sd_1+Sd_2+Sd_3)=Kd \; i=1,\ldots 6$$

If the position-specifically averaged measurement signal $(Sd_1+Sd_2+Sd_3)$ is identical to the digital calibration signal Kd, then the calibration factor $\alpha_i=1.00$. Typically, the calibration factor $\alpha_i$ varies in a range from 0.85 to 1.15. The calibration factor $\alpha_i$ can be stored in the data memory of the computer 16 of the evaluation unit 16.

LIST OF REFERENCE NUMERALS 9 workpiece
10 cutting machine
11 tool slide
11.00 tool contact surface
12 force transducer
12.1 single-component force transducer
12.2 single-component force transducer
12.3 single-component force transducer
12.10 signal line
12.20 signal line
12.30 signal line
12.11 first housing end face
12.21 first housing end face
12.31 first housing end face
12.12 second housing end face
12.22 second housing end face
12.32 second housing end face
12.4 signal socket
12.5 signal cable
13 tool holder
13.00 contact surface
13.01-06 tool recess
13.07-09 recess
13.10 cavity
13.11-16 first retaining means
13.21-26 second retaining means
13.31-33 first fastening means
13.41-43 second fastening means 14.01-06 required tool
16, 26 evaluation unit
16.1, 26.1 converter unit
16.2, 26.2 computer
16.3, 26.3 input unit
16.4, 26.4 output unit
20 calibration device
21 calibration drive unit
22 calibration contact
23 calibration force transducer
23.5 calibration signal cable
210-260 process steps
$\alpha_i$ position-specific calibration factor
$\Delta$ difference
I position
Kw tool force
Kwx main cutting force component
Kwy passive force component
Kwz forward feed force component
Kk calibration force
Kkx main cutting force calibration component
$Sa_1$, $Sa_2$, $Sa_3$ analog measurement signal
$Sd_1$, $Sd_2$, $Sd_3$ digital measurement signal
$(Sd_1+Sd_2+Sd_3)$ position-specifically averaged measurement signal
R reference signal
Ka analog calibration signal
Kd digital calibration signal
s gap
T predefined tolerance value
x transverse axis
y horizontal axis
z vertical axis
xy transverse plane
xz vertical plane

The invention claimed is:

1. A cutting machine for the chip-removing machining of a workpiece, which chip-removing machining takes place in a chronological sequence of manufacturing steps by using several required tools; wherein in each manufacturing step a required tool can exert a tool force onto the workpiece in a force main direction; the cutting machine comprising:
a tool holder configured for holding the required tools all at the same time, wherein the tool holder defines a plurality of recesses and at least one cavity;
a plurality of signal lines and a signal socket connected to the tool holder,
a tool slide configured for moving the tool holder so that one of the required tools can be aligned with a workpiece and the required tool and the workpiece can be moved with respect to each other for chip-removing machining in each manufacturing step;
wherein the tool holder includes a first fastening means and a second fastening means;
wherein the tool holder is fastened to the tool slide via the first fastening means and via the second fastening means;
wherein the tool holder fastened to the tool slide is spaced apart from the tool slide by a gap proximate the plurality of recesses;
wherein the tool holder includes at least two single-component force transducers;
wherein each of the at least two single-component force transducers is configured to measure a tool force exerted by one of the required tools during the chip-removing machining of a workpiece in the force main direction;
wherein each of the single-component force transducers is inserted into a respective one of the plurality of recesses;
wherein each of the single-component force transducers is electrically connected to the signal socket via a respective one of the plurality of signal lines;
wherein the plurality of signal lines is introduced into the cavity;
wherein the tool holder defines a plurality of first housing end faces and a plurality of second housing end faces; and
wherein the single-component force transducers inserted into the plurality of recesses are in planar contact to the tool slide via the second housing end faces proximate the recesses.

2. The cutting machine according to claim 1, wherein the tool holder fastened to the tool slide is in planar contact to the tool slide via a contact surface that is disposed proximate the second fastening means; and wherein the cavity of the tool holder fastened to the tool slide is sealed by the tool slide.

3. The cutting machine according to claim 2, wherein a sum of the second housing end faces of the single-component force transducers is larger than the contact surface of the tool holder.

4. The cutting machine according to claim 1, wherein each of the at least two single-component force transducers measures a respective different force component of the tool force.

5. The cutting machine according to claim 1, wherein each of the at least two single-component force transducers is configured to measure the tool force independently of each of the other at least two single-component force transducers; and wherein each of the at least two single-component force transducers generates analog measurement signals that correspond to a main cutting force exerted on the workpiece.

6. The cutting machine according to claim 5, wherein the tool holder is configured to hold the required tools in a plurality of different positions during the chip-removing machining; and wherein each of the at least two single-component force transducers is configured to measure the tool force in each of the plurality of different positions.

7. The cutting machine according to claim 6, further comprising at least one converter unit that is configured to convert analog measurement signals for each manufacturing step performed by a required tool into digital measurement signals; and at least one computer that is configured to sum up the digital measurement signals for each manufacturing step to obtain a position-specifically averaged measurement signal.

8. The cutting machine according to claim 7, wherein the computer is configured to store reference signals for a material of the workpiece and for a cutting material of a required tool; wherein the computer is configured to read out a reference signal for each manufacturing step; wherein the computer is configured to store calibration factors for a position of a required tool relative to each respective one of the at least two single-component force transducers; wherein the computer is configured to import a calibration factor for each manufacturing step; wherein the computer is configured to multiply the position-specifically averaged measurement signal by a read out calibration factor for each manufacturing step; and wherein the computer is configured to calculate a difference of the position-specifically averaged measurement signal multiplied by a read out calibration factor and the read out reference signal for each manufacturing step.

9. The cutting machine according to claim 7, wherein the computer is configured to store predefined tolerance values; wherein the computer is configured to read out a predefined tolerance value for each manufacturing step; wherein for each manufacturing step the computer is configured to compare a difference to the predefined tolerance value; and wherein the computer is configured to determine that the required tool is not abraded to a degree warranting replacement of the required tool so long as the difference is not greater than the predefined tolerance value.

10. The cutting machine according to claim 9, wherein the computer is configured so that upon determining that the difference exceeds the predefined tolerance value, then the computer signals that the required tool is to be replaced.

11. A cutting machine for the chip-removing machining of a workpiece, which chip-removing machining takes place in a chronological sequence of manufacturing steps by using several required tools, wherein in each manufacturing step a required tool can exert a tool force onto the workpiece in a force main direction, the cutting machine comprising:
- a tool holder configured for holding the required tools all at the same time, wherein the tool holder defines a plurality of recesses and at least one cavity:
- a plurality of signal lines introduced into the cavity and connected to the tool holder;
- wherein the tool holder includes at least two single-component force transducers;
- wherein each of the single-component force transducers is inserted into a respective one of the plurality of recesses;
- a tool slide configured for moving the tool holder so that one of the required tools can be aligned with a workpiece and the required tool and the workpiece can be moved with respect to each other for chip-removing machining in each manufacturing step;
- wherein each of the at least two single-component force transducers is configured to measure a tool force exerted by one of the required tools during the chip-removing machining of a workpiece in the force main direction;
- a signal socket connected to the tool holder;
- wherein each of the single-component force transducers is electrically connected to the signal socket via a respective one of the plurality of signal lines;
- wherein the tool holder includes a first fastening means and a second fastening means;
- wherein the tool holder is fastened to the tool slide via the first fastening means and via the second fastening means; and
- wherein the first fastening means, by fastening the tool holder to the tool slide, mechanically biases the single-component force transducers inserted into the plurality of recesses.

12. A method for calibrating single-component force transducers of a cutting machine that includes a calibration force transducer, a tool holder that holds at least a first required tool and a second required tool, and at least two single-component force transducers, the method comprising the following steps:
- disposing the first required tool in a first position relative to the at least two single-component force transducers;
- disposing the second required tool in a second position relative to the at least two single-component force transducers, wherein the first position is spaced apart from the second position;
- applying a calibration force to the first required tool and to the second required tool;
- measuring the calibration force by the at least two single-component force transducers and by the calibration force transducer;
- wherein the at least two single-component force transducers generate analog measurement signals for the measured calibration force;
- wherein analog calibration signals are generated by the calibration force transducer for the measured calibration force;
- converting the analog measurement signals into digital measurement signals;
- converting the analog calibration signals into digital calibration signals;
- summing the digital measurement signals to obtain a position-specifically averaged measurement signal pertaining to the first position and to the second position;
- comparing the position-specifically averaged measurement signal of the first position of the first required tool to a digital calibration signal of the first position of the first required tool to obtain a first calibration factor specific to the first position of the first required tool relative to the at least two single-component force transducers; and
- comparing the position-specifically averaged measurement signal of the second position of the second required tool to a digital calibration signal of the second position of the second required tool to obtain a second calibration factor specific to the position of the second required tool relative to the at least two single-component force transducers.

* * * * *